(12) United States Patent
Hursan

(10) Patent No.: US 7,705,592 B2
(45) Date of Patent: Apr. 27, 2010

(54) TWO DIMENSIONAL T1/T2APP-T2APP PROCESSING OF MULTI-GRADIENT NMR DATA

(75) Inventor: Gabor Hursan, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 208 days.

(21) Appl. No.: 12/024,500

(22) Filed: Feb. 1, 2008

(65) Prior Publication Data
US 2009/0198446 A1    Aug. 6, 2009

(51) Int. Cl.
G01V 3/00      (2006.01)
(52) U.S. Cl. .................... 324/301; 324/303; 324/322
(58) Field of Classification Search .............. 324/301, 324/300, 303, 309, 310, 312, 318, 322, 323, 324/324; 702/1, 2, 6, 11
See application file for complete search history.

(56) References Cited

U.S. PATENT DOCUMENTS

| | | | |
|---|---|---|---|
| 5,486,762 | A | 1/1996 | Freedman et al. |
| 5,498,960 | A | 3/1996 | Vinegar et al. |
| 5,680,043 | A | 10/1997 | Hurlimann et al. |
| 6,032,101 | A | 2/2000 | Freedman et al. |
| 6,331,775 | B1 | 12/2001 | Thern et al. |
| 6,392,409 | B1 | 5/2002 | Chen |
| 6,600,316 | B2 | 7/2003 | Chen et al. |
| 7,298,142 | B2 | 11/2007 | Hursan et al. |
| 7,352,179 | B2 * | 4/2008 | Chen et al. .................. 324/303 |
| 2002/0175682 | A1 | 11/2002 | Chen et al. |
| 2003/0107374 | A1 | 6/2003 | Chen et al. |
| 2005/0162162 | A1 | 7/2005 | Itskovich et al. |
| 2005/0272158 | A1 | 12/2005 | Galford et al. |
| 2006/0122779 | A1 | 6/2006 | Minh et al. |
| 2007/0032956 | A1 | 2/2007 | Blanz et al. |
| 2007/0244648 | A1 * | 10/2007 | Chen .......................... 702/11 |
| 2008/0272773 | A1 * | 11/2008 | Romero et al. .............. 324/300 |

OTHER PUBLICATIONS

M.G. Prammer, et al. "Lithology-Independent Gas Detection by Gradient-NMR Logging". SPE 30562. Oct. 22-25, 1995. pp. 325-336.
G.R. Coates, et al. "Restrictive Diffusion From Uniform Gradient NMR Well Logging". SPE 26472. Oct. 3-6, 1993. pp. 575-590.
R.L. Kleinberg, et al. "Nuclear Magnetic Resonance of Rocks: T1 vs. T2". SPE 26470. Oct. 3-6, 1993. pp. 553-563.
International Search Report for International Application No. PCT/US2009/032612. Mailed Sep. 25, 2009.
Written Opinion of the International Searching Authority for International Application No. PCT/US2009/032612. Mailed Sep. 25, 2009.

* cited by examiner

*Primary Examiner*—Hoai-An D Nguyen
(74) *Attorney, Agent, or Firm*—Cantor Colburn LLP

(57) ABSTRACT

A method for estimating a property of a material, the method including: acquiring data using nuclear magnetic resonance (NMR) measurements, the measurements performed by varying at least one of a magnetic field gradient (G) and an inter-echo time (TE); organizing the data according to at least one of magnetic field gradients (G) and inter-echo times (TE) used in the NMR measurements; calculating a shift of apparent transverse relaxation time ($T_{2,app}$) and (longitudinal relaxation time $T_1$)/(apparent transverse relaxation time $T_{2,app}$) due to a variation of the product of G and TE; constructing a mathematical model of the NMR measurements from the shifts; and inverting the mathematical model to estimate the property.

20 Claims, 12 Drawing Sheets

US 7,705,592 B2

TWO DIMENSIONAL T1/T2APP-T2APP PROCESSING OF MULTI-GRADIENT NMR DATA

BACKGROUND OF THE INVENTION

1. Field of the Invention

The invention disclosed herein relates to an assessment of a material by use of nuclear magnetic resonance (NMR) and, in particular, to use of a mathematical model for two-dimensional relaxation analysis.

2. Description of the Related Art

Downhole characterization techniques are of considerable value for geophysical exploration. For example, characterization of parameters associated with geologic formations provides for insight into any reservoirs of hydrocarbons, which may be present. More specifically, knowledge of porosity and percentage of movable fluids can provide insight into the quantity of hydrocarbons that may be extracted from the formation. A number of technologies are applied downhole for in-situ determination of these parameters. These technologies include nuclear magnetic resonance (NMR) imaging.

When performing NMR imaging, vast quantities of data are obtained. The data generally includes longitudinal and transverse relaxation times that are obtained using various magnetic field gradients and/or inter-echo times. In the prior art, this data is organized into groups of data that were obtained with the same magnetic field gradient and/or inter-echo time. A two-dimensional inversion operator is then applied to each group to determine a petrophysical characteristic such as porosity. Because each data group has less data than the total amount of data, inversion of these partial data sets can lead to inadequate spectral resolution and increased uncertainty in hydrocarbon characterization.

Therefore, what are needed are techniques to improve spectral resolution and decrease uncertainty in hydrocarbon characterization when performing NMR imaging.

BRIEF SUMMARY OF THE INVENTION

Disclosed is one example of a method for estimating a property of a material, the method including: acquiring data using nuclear magnetic resonance (NMR) measurements, the measurements performed by varying at least one of a magnetic field gradient (G) and an inter-echo time (TE); organizing the data according to at least one of magnetic field gradients (G) and inter-echo times (TE) used in the NMR measurements; calculating a shift of apparent transverse relaxation time ($T_{2,app}$) and a shift of (longitudinal relaxation time $T_1$)/(apparent transverse relaxation time $T_{2,app}$) due a variation of the product of G and TE; constructing a mathematical model of the NMR measurements from the shifts; and inverting the mathematical model to estimate the property.

Also disclosed is an apparatus for estimating a property of a material, the apparatus including: a probe for making nuclear magnetic resonance measurements, the measurements performed by varying at least one of a magnetic field gradient and an inter-echo time; and an electronics unit for receiving data from the probe and for: organizing the data according to at least one of magnetic field gradients (G) and inter-echo times (TE) used in the NMR measurements; calculating a shift of apparent transverse relaxation time $T_{2,app}$ and a shift of (longitudinal relaxation time $T_1$)/(apparent transverse relaxation time $T_{2,app}$) due to a variation of the product of G and TE; constructing a mathematical model of the NMR measurements from the shifts; and inverting the model to estimate the property.

Further disclosed is a computer program product stored on machine readable media including machine executable instructions for estimating a property of a material, the product including instructions for: acquiring data using nuclear magnetic resonance (NMR) measurements, the measurements performed by varying at least one of a magnetic field gradient (G) and an inter-echo time (TE); organizing the data according to at least one of magnetic field gradients and inter-echo times used in the NMR measurements; calculating a shift of apparent transverse relaxation time $T_{2,app}$ and a shift of (longitudinal relaxation time $T_1$)/(apparent transverse relaxation time $T_{2,app}$) due to a variation of the product of G and TE; constructing a mathematical model of the NMR measurements from the shifts; inverting the mathematical model to estimate the property; and at least one of recording the property and displaying the property to a user.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
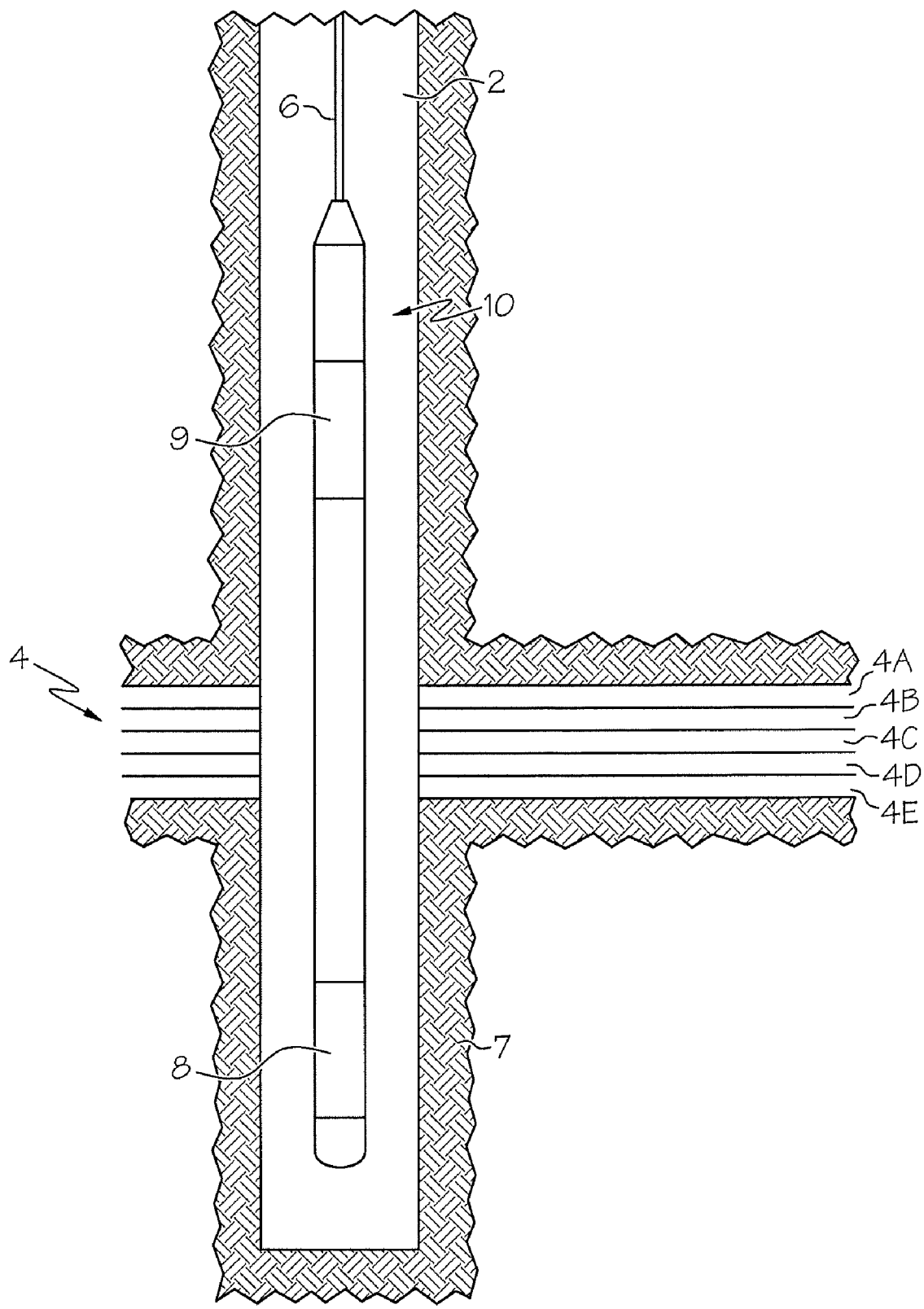
FIG. 1 illustrates an exemplary embodiment of a logging instrument in a borehole penetrating the earth.

The teachings provide techniques for processing nuclear magnetic resonance (NMR) data to determine a property of a material. The techniques include a method and an apparatus for simultaneously calculating longitudinal and transverse relaxation time spectra as well as volumetric attributes associated with NMR petrophysical analysis. The techniques are based upon a generalized mathematical model of NMR instrument responses that account for variation of a magnetic field gradient and/or an inter-echo time between different parts of a data set. Two-dimensional NMR relaxation analysis is provided by the mathematical model.

Significant advantages of two-dimensional relaxation analysis include: a) enhanced stability and reduced complexity of implementation with respect to gradient-by-gradient type processing and b) an increased spectral resolution due to the expanded amount of input data available for processing.

For convenience, certain definitions are provided for use throughout this specification. The term "two-dimensional" relates to operating on a data set that includes two variables such as apparent transverse relaxation time ($T_{2,app}$) and the ratio of longitudinal relaxation time to apparent transverse relaxation time ($T_1/T_{2,app}$). The term "multi-gradient" relates to variations in at least one parameter used to perform an NMR measurement. The term "petrophysical attributes" relates to characteristics of a material in a geologic formation or subsurface material. Examples of petrophysical attributes include total porosity, effective porosity, percentage of clay-bound water, percentage of capillary-bound water, and percentage of movable fluids. The term "parametrization" relates to organizing NMR data according to the parameters with which the data was obtained and the mathematical representation and discretization of the NMR relaxation models into a finite set of mathematical quantities suitable for computer programming. Examples of the parameters include a magnetic field gradient, an inter-echo time, and a set of bines representing a particular combination of $T_{2,app}$ and $T_1/T_{2,app}$.

As a matter of convention, one should note that the variables used herein appear throughout the disclosure. Accordingly, previously defined variables are generally not reintroduced. For convenience of referencing, some of the following representations are applied herein, or related to the teachings herein: D represents diffusivity of a fluid; G represents a magnetic field gradient that is frequency dependent and produced by a NMR instrument; $T_1$ represents longitudinal relaxation time measured by the NMR instrument; $T_2$ represents transverse relaxation time measured by the NMR instrument; $T_{2,app}$ represents apparent $T_2$ where $1/T_{2,app}=1/T_{2,int}+1/T_{2,diff}$; $T_{2,diff}$ represents transverse relaxation time due to molecular diffusion in a magnetic field gradient such that $1/T_{2,diff}(\gamma \cdot G \cdot TE)^2 \cdot D/12$; $T_{2,int}$ represents intrinsic transverse relaxation time due to intermolecular interactions such that $1/T_{2,int}=1/T_{2,bulk}+1/T_{2,surf}$; $T_{2,bulk}$ represents bulk fluid transverse relaxation time, which is $T_2$ measured in a bulk state, for non-wetting fluids $1/T_{2,bulk} \cong 1/T_{2,int}$; $T_{2,surf}$ represents surface transverse relaxation time; $\gamma$ represents the gyromagnetic ratio; R represents the ratio of $T_1$ to apparent $T_2$ such that $R=T_1/T_{2,app}$; TE represents inter-echo time, the time between two adjacent echoes; and TW represents wait time, the time between the last data acquired in the previous data acquisition event and the first excitation of the current data acquisition event of the same frequency.

Referring to FIG. 1, a well logging instrument 10 is shown disposed in a borehole 2. The borehole 2 is drilled through earth 7 and penetrates formations 4, which include various formation layers 4A-4E. The logging instrument 10 is typically lowered into and withdrawn from the borehole 2 by use of an armored electrical cable 6 or similar conveyance as is known in the art. While the embodiment of FIG. 1 depicts the borehole 2 traversing the formation 4, the borehole 2 can also traverse subsurface material, which may be imaged by the instrument 10. The well logging instrument 10 is adapted for performing NMR measurements. In the embodiment of FIG. 1, the instrument 10 includes an NMR probe 8 and an electronics unit 9. The NMR probe 8 includes a device for producing a magnetic field gradient and an antenna for receiving NMR signals from the formations 4. The electronics unit 8 is adapted for receiving and processing signals from the probe 8 where the signals are related to the NMR measurements.

The well logging instrument 10 and method are equally suited for use in LWD applications and in open-borehole and cased-borehole wireline applications. In LWD applications, the apparatus may be disposed in a drilling collar. Generally, the well logging instrument 10 includes adaptations as may be necessary to provide for operation during drilling or after a drilling process has been completed.

In typical embodiments, the borehole 2 includes materials such as would be found in oil exploration, including a mixture of liquids such as water, drilling fluid, mud, oil, gases, and formation fluids as may be indigenous to the surroundings. One skilled in the art will recognize that the various geologic features as may be encountered in a subsurface environment may be referred to as "formations," and that the array of materials down the borehole (i.e., downhole) may be referred to as "sub-surface materials." That is, the formations are formed of sub-surface materials. Accordingly, as used herein, it should be considered that while the term "formation" generally refers to geologic formations of interest, and "sub-surface material," includes any materials of interest such as fluids, gases, liquids, and the like.

A description of an exemplary method for processing NMR data is now presented. A response of the logging instrument 10 from performing a CPMG measurement may be expressed as shown in equations (1), (2), and (3).

$$M(T, TW, G, TE)_i = \sum_j m_j (1 - \exp(-TW_i/(T_{2,app,j} \cdot R_j)))\exp(-t_i/T_{2,app,j}) \quad (1)$$

$$\frac{1}{T_{2,app}} = \frac{1}{T_{2,int}} + \left(D \cdot \left(\frac{(\gamma \cdot G \cdot TE)^2}{12}\right)\right) \quad (2)$$

$$R = \frac{T_1}{T_{2,app}} = \frac{T_1}{T_{2,int}} + \left(T_1 D \cdot \left(\frac{(\gamma \cdot G \cdot TE)^2}{12}\right)\right) \quad (3)$$

where $m_j$ represents the frequency of occurrence of hydrogen particles that have a combination of apparent $T_2$ and $T_1/T_{2,app,j}$ indexed by j and M(t, TW, G, TE)$_i$ represents predicted data for the $i^{th}$ combination of acquisition parameters.

Different combinations of the magnetic field gradient, G, and the echo spacing, TE, may be expressed as shown in equations (4) and (5) where the notation REF refers to a reference value while k represents an arbitrary index, ranging the number of different combinations of G and TE.

$$R_{REF} = \frac{T_1}{T_{2,int}} + \left(T_1 D \cdot \left(\frac{(\gamma \cdot G_{REF} \cdot TE_{REF})^2}{12}\right)\right) \quad (4)$$

$$R_k = \frac{T_1}{T_{2,int}} + \left(T_1 D \cdot \left(\frac{(\gamma \cdot G_k \cdot TE_k)^2}{12}\right)\right) \quad (5)$$

Equation (6) can be used to relate $R_k$ and $R_{REF}$.

$$\frac{R_k - \frac{T_1}{T_{2,int}}}{R_{REF} - \frac{T_1}{T_{2,int}}} = \frac{(G_k \cdot TE_k)^2}{(G_{REF} \cdot TE_{REF})^2} \quad (6)$$

Equation (6) can be rearranged to produce equation (7).

$$R_k = \frac{T_1}{T_{2,int}} + \left(R_{REF} - \frac{T_1}{T_{2,int}}\right) \cdot \frac{(G_k \cdot TE_k)^2}{(G_{REF} \cdot TE_{REF})^2} \quad (7)$$

From the definition of R presented above, diffusivity, D, can be expressed as shown in equation (8).

$$D = \frac{12(R_{REF} - (T_1/T_{2,int}))}{T_1(\gamma \cdot G_{REF} \cdot TE_{REF})^2} \quad (8)$$

From equation (4), the inverse of $T_{2,app,REF}$ can be presented in terms of D as shown in equation (9).

$$\frac{1}{T_{2,app,REF}} = \frac{1}{T_{2,int}} + D \cdot \frac{(\gamma \cdot G_{REF} \cdot TE_{REF})^2}{12} \quad (9)$$

Similarly from equation (5), the inverse of $T_{2,app,k}$ can also be presented in terms of D as shown in equation (10).

$$\frac{1}{T_{2,app,k}} = \frac{1}{T_{2,int}} + D \cdot \frac{(\gamma \cdot G_k \cdot TE_k)^2}{12} \quad (10)$$

The inverse of the apparent $T_2$ at index k may be expressed as a function of the apparent $T_2$ at $G_{REF}$ and $TE_{REF}$ as shown in equation (11).

$$\frac{1}{T_{2,app,k}} = \frac{1}{T_{2,app,REF}} + D \cdot \frac{(\gamma \cdot G_k \cdot TE_k)^2 - (G_{REF} \cdot TE_{REF})^2}{12} \quad (11)$$

The diffusivity formula (equation (8)) may be substituted into equation (11) to provide equation (12). Equation (12) demonstrates how the diffusion effect affects the apparent $T_2$ for changes in combinations of G and TE.

$$\frac{1}{T_{2,app,k}} = \frac{1}{T_{2,app,REF}} + \frac{(R_{REF} - (T_1/T_{2,int}))}{T_1} \cdot \frac{(G_k \cdot TE_k)^2 - (G_{REF} \cdot TE_{REF})^2}{(G_{REF} \cdot TE_{REF})^2} \quad (12)$$

Using equations (7) and (12) in the response of the logging instrument 10 from equation (1), provides the generalized forward operator that accounts for the variations of G and TE in the data set. The generalized forward operator can be used to predict for any point in the domain of R and $T_{2,app}$ where the point will move due to a given change in the product of G·TE.

Figure 2:
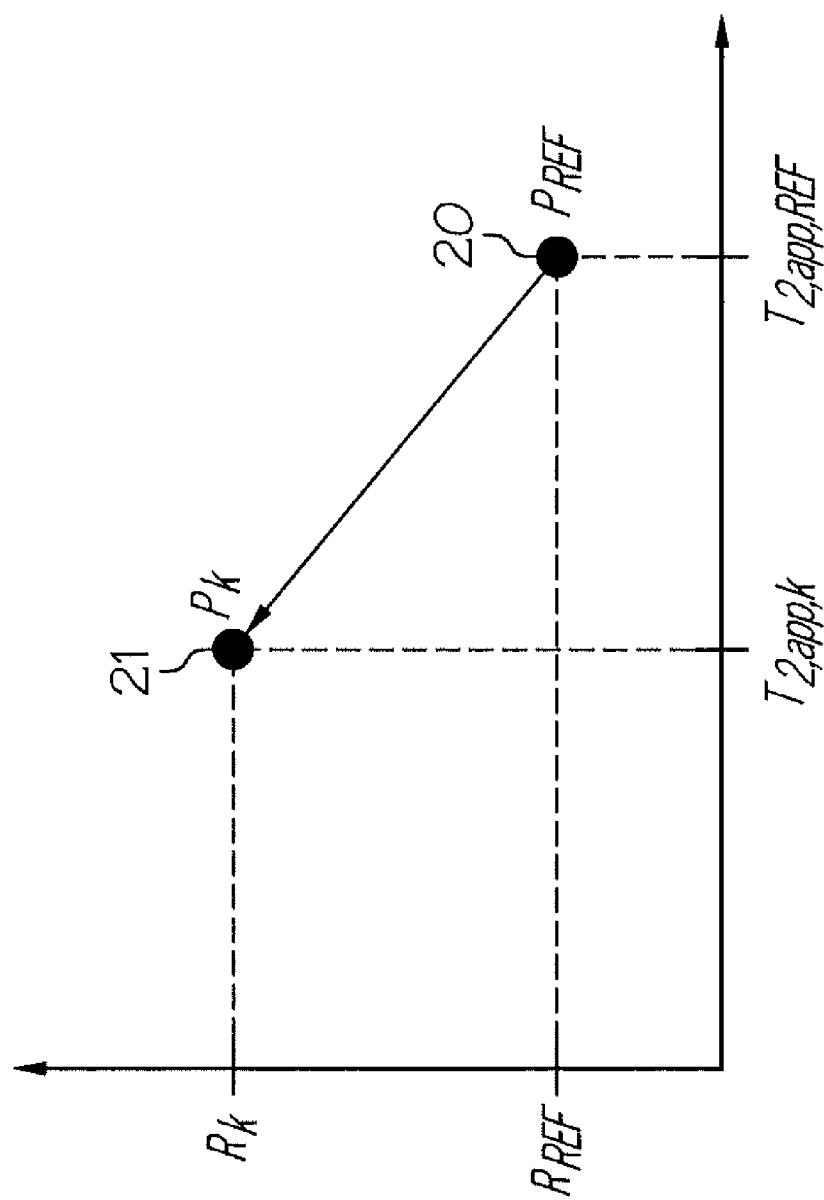
FIG. 2 presents a graph of R vs. $T_{2,app}$ for a reservoir fluid depicting a position shift due to a gradient increase with respect to a reference value.
Figure 3:
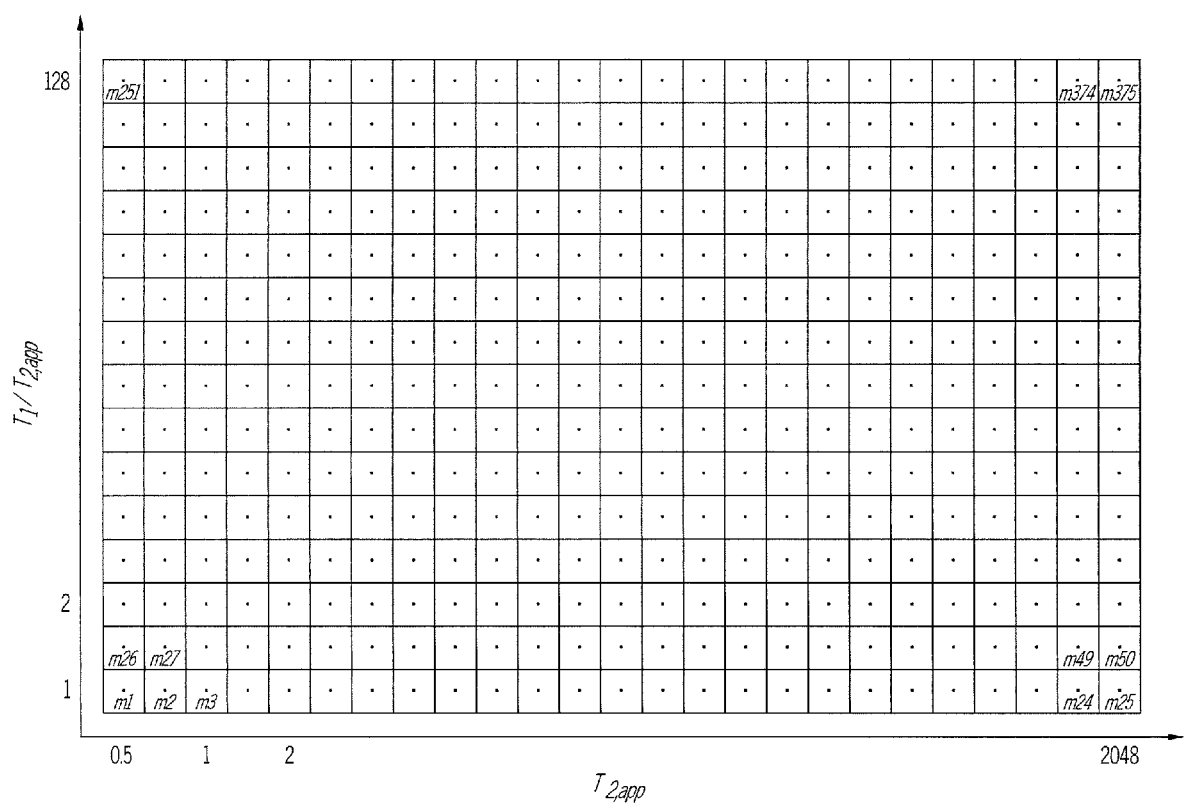
FIG. 3 depicts aspects of organizing parameters into a vector with indices indicated in a plot of R vs. $T_{2,app}$.

For example, referring to FIG. 2, the generalized forward operator predicts the relative position change of point $P_{REF}$ 20 (associated with the product $G_{REF} \cdot TE_{REF}$) to the point $P_k$ 21 (associated with the product $G_k \cdot TE_k$). In this example, $G_{REF} \cdot TE_{REF}$ is less than $G_k \cdot TE_k$. It can be seen that R increases while $T_{2,app}$ decreases whereas $T_1$, which is not affected by the diffusivity effect, remains unchanged. Note that the second terms in equations (11) and (12) are zero and $R_{REF}$ becomes equal to $R_k$ in equation (7) when the product $G_k \cdot TE_k$ equals the product $G_{REF} \cdot TE_{REF}$.

Inversion of the generalized forward operator is now presented. The response of the logging instrument 10 given by equation (1) can be represented as a system of linear equations (13) using equations (14) and (15).

$$d_i = A_{i,j} m_j \quad (13)$$

$$d_i = M(t, TW, G, TE)_i \quad (14)$$

$$A_{i,j} = (1 - \exp(-TW_i/(T_{2,app,j} \cdot R_j))) \exp(-t_i/T_{2,app,j}) \quad (15)$$

Since data noise generally follows Gaussian statistics, a least squares solution will be used. Prior information about (a) data uncertainties populated in a data covariance matrix $C_d$, (b) a most likely model $m_{apr}$, and (c) model $m_{apr}$ uncertainties represented by the prior model covariance matrix $C_m$ are built into the formulation. The a posteriori solution is presented in equations (16) and (17) where $A^T$ is the transpose matrix of A.

$$m^\# = A^\# d = ((A^T C_d^{-1} A) + C_m^{-1})^{-1}((A^T C_d^{-1} d) + (C_m^{-1} m_{apr})) \quad (16)$$

The inverse operator is denoted as $A^\#$. With the assumption of Gaussian data represented by the data covariance matrix $C_d$, the covariance theorem suggests that the a posteriori solution is represented as a Gaussian probability distribution in a model space defined by the maximum likelihood (mean) point $m^\#$ given by equation (16) and a posteriori model covariance matrix $C_m^\#$ as shown in equation (17).

$$C_m^\# = A^\# C_d A^{\#T} = ((A^T C_d^{-1} A) + C_m^{-1})^{-1}(A^T C_d^{-1} A)((A^T C_d^{-1} A) + C_m^{-1})^{-T} \quad (17)$$

The maximum likelihood point $m^\#$ is equivalent to the Tikhonov-regularized least squares solution, where the inverse of the prior model covariance is known as the stabilizer matrix. An important attribute of the a posteriori model covariance matrix is that it explicitly determines how random data errors propagate into any given combination of parameters in the inverted model.

The concept of a model resolution matrix is used by substituting any noise-free data of the form $d^{true} = Am^{true}$ into equation (16) to provide equation (18).

$$m^\# = A^\# A m^{true} = R_{mrm} m^{true} \quad (18)$$

Here, matrix $R_{mrm} = A^\# A$ is defined as the "model resolution matrix." Each column of the model resolution matrix displays the spread of the corresponding model parameter into other parameters in the solution. Optimally, the model resolution matrix is the identity matrix, where the model is completely resolved. When the model is ill-posed, $R_{mrm}$ is always different from the identity matrix even at high signal-to-noise conditions. For example, assuming a zero prior model, the resolution matrix of the least squares becomes equation (19).

$$R_{mrm} = (A^T C_d^{-1} A + C_m^{-1})^{-1} A^T C_d^{-1} A \quad (19)$$

Analyzing the behavior of the model resolution matrix is a standard approach to measure regularization-related loss of model information for an inverse problem.

With a given prior model uncertainty and less noisy and/or more numerous data, the solution becomes better resolved and with decreasing uncertainties. Also, it can be seen that at given data noise conditions the more prior model information that is imposed to the solution via $C_m$, the smaller the a posteriori model variations due to data noise. On the other hand, increasing the importance of $C_m$ will degrade the model resolution matrix. It is important to find the right balance between the noise-related model variations and the level of degradation due to regularization. Several algorithms exist to scale data and model uncertainties for actual data sets. For illustration purposes, prior data and model information are unchanged through all examples in order to better expose the effect of the generalized forward operator.

An error analysis of the techniques is now presented. For the error analysis, a data set from CPMG NMR measurements with multiple magnetic field gradients is considered. The data set includes 16 short echo trains and 10 long echo trains with a variety of wait-times, suitable to investigate light hydrocarbons via $R$-$T_{2,app}$ analysis. Each short echo train includes 25 equally spaced echoes with an echo spacing (TE) of 0.4 milliseconds (msec.). Similarly, each long echo train includes 690 equally spaced echoes with an echo spacing of 0.6 msec. The short echo trains have wait times of 20-300 msec. four of the long echo trains are partially polarized at TW=1000 msec. while the remaining six long echo trains have TW=9200-13200 msec. For simultaneous acquisition, the data are collected at six different frequencies corresponding to six different magnetic field gradients. The total number of data points is 7300. Measurement errors are characterized with an uncorrelated Gaussian data noise with a variance of one for every data point. Also, it is assumed that an uncorrelated prior model is represented by zero mean and unit variance.

The following parametrization is used for all analyses. The $T_{2,app}$ versus $T_1/T_{2,app}$ relaxation model spans a rectangular domain with $T_{2,app}$ between 0.5 and 2048 msec. and $T_1/T_{2,app}$ ranging from 1 to 128. This domain is subdivided into 25×15=375 bins in a logarithmically equidistant fashion with an increment of $2^{0.5}$ in both $T_{2,app}$ and $T_1/T_{2,app}$ directions. Unknown parameters are the intensity values $m_j$ for each particular combination of $T_{2,app}$ and $T_1/T_{2,app}$. The parameters are indexed with $T_{2,app}$ varying faster and $T_1/T_{2,app}$ increasing as shown in FIG. 2.

Three different inversion schemes (Schemes A, B, and C) are used to reconstruct the above model parametrization. Scheme A uses all echo trains (7300 data points having a variety of G and TE) with a model based on the single G and TE formulation. This scheme assumes no significant differences in G and/or TE between different long echo trains.

In Scheme B, the long echo trains at the highest gradient are used with the single G and TE formulation. As diffusivity effects are negligible for the short echo trains, all of the short echo trains are used. The sixteen short echo trains and the two long echo trains amount to a total of 1780 data points.

As with Scheme A, Scheme C uses all echo trains with the 7300 data points. However, Scheme C uses the multi-gradient model formulation introduced above.

Figure 4:
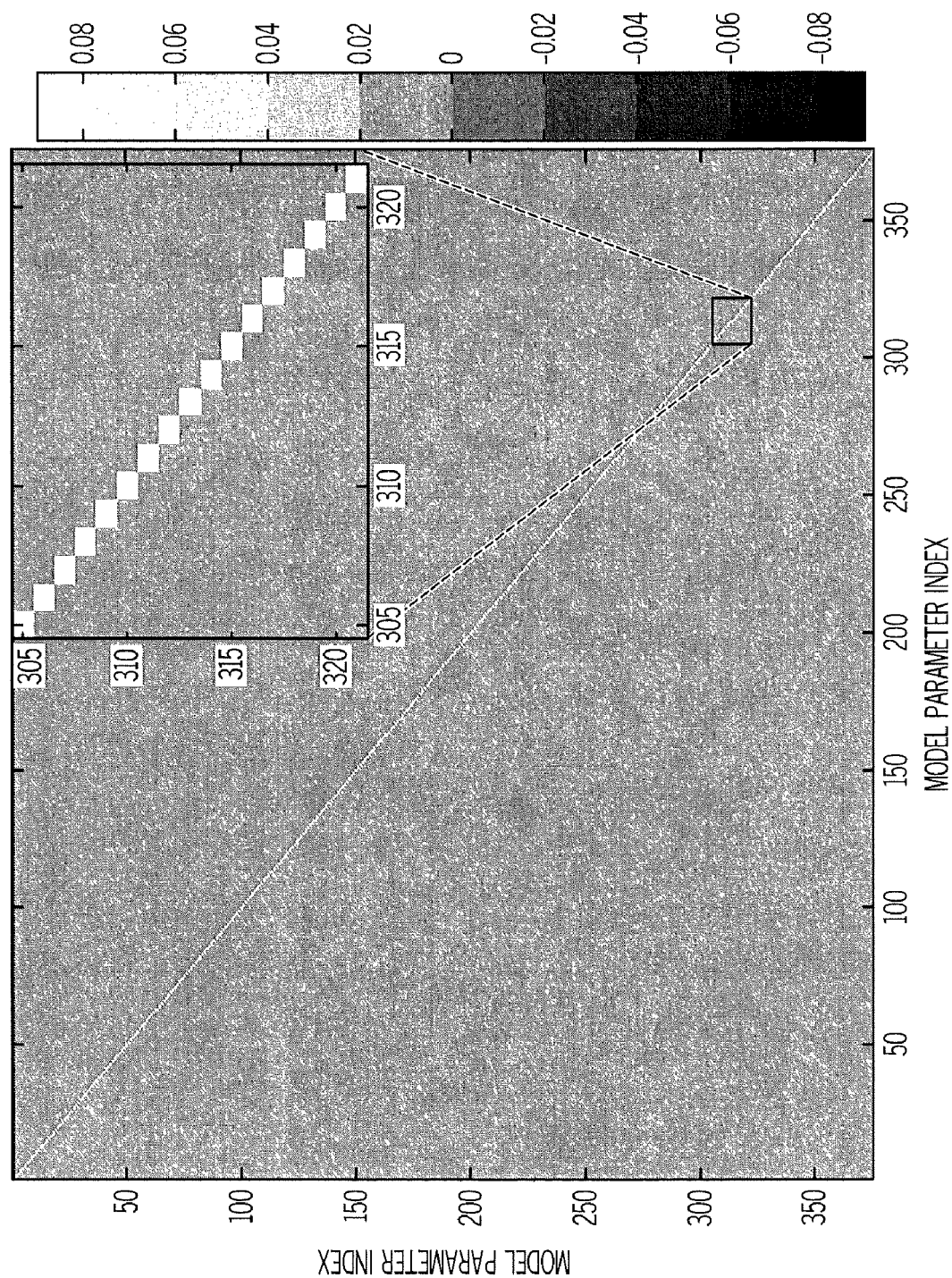
FIG. 4 is a representation of an identity matrix.
Figure 5:
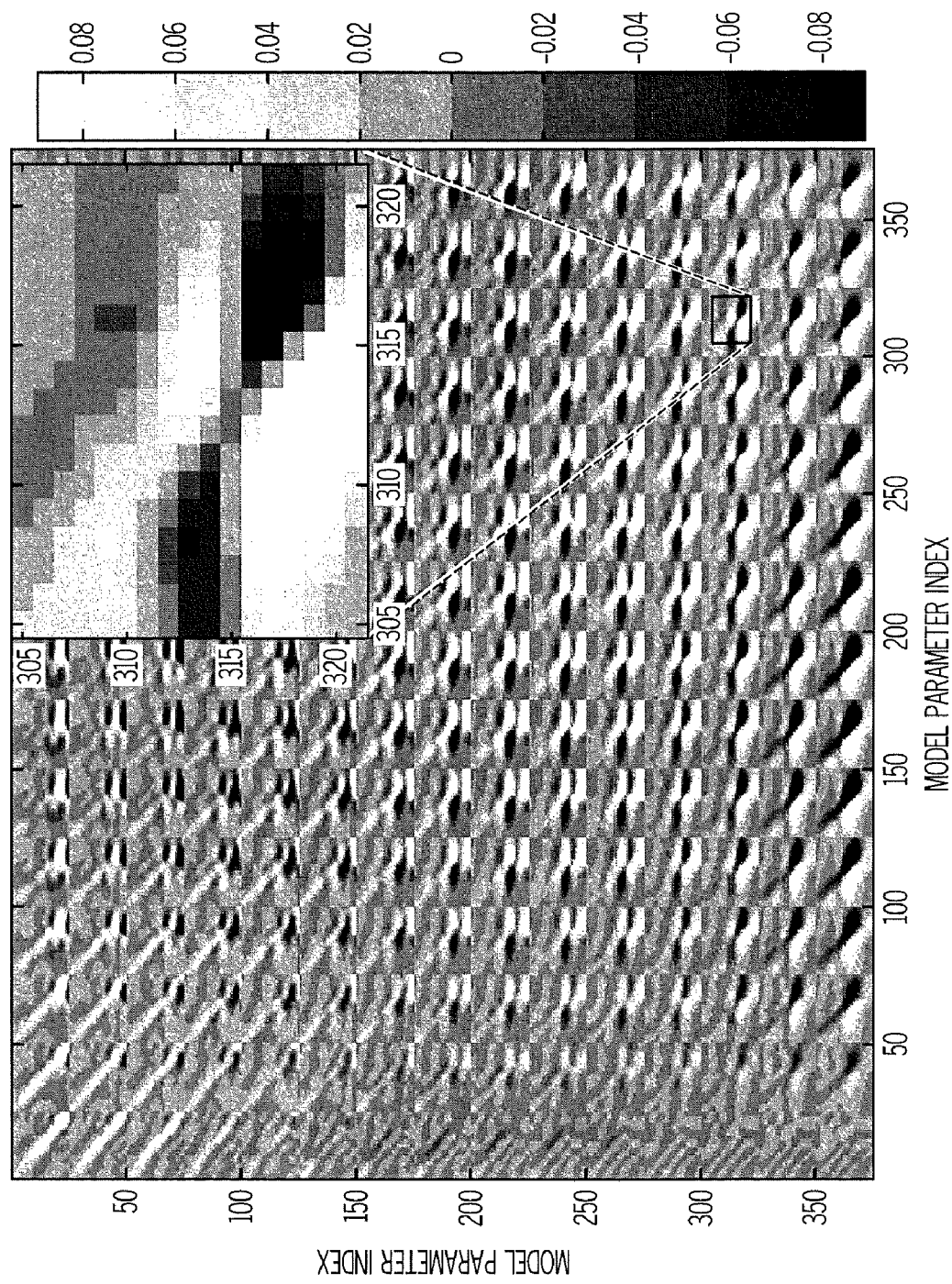
FIG. 5 is a representation of a model resolution matrix where multi-gradient data are processed with a single gradient algorithm.
Figure 6:
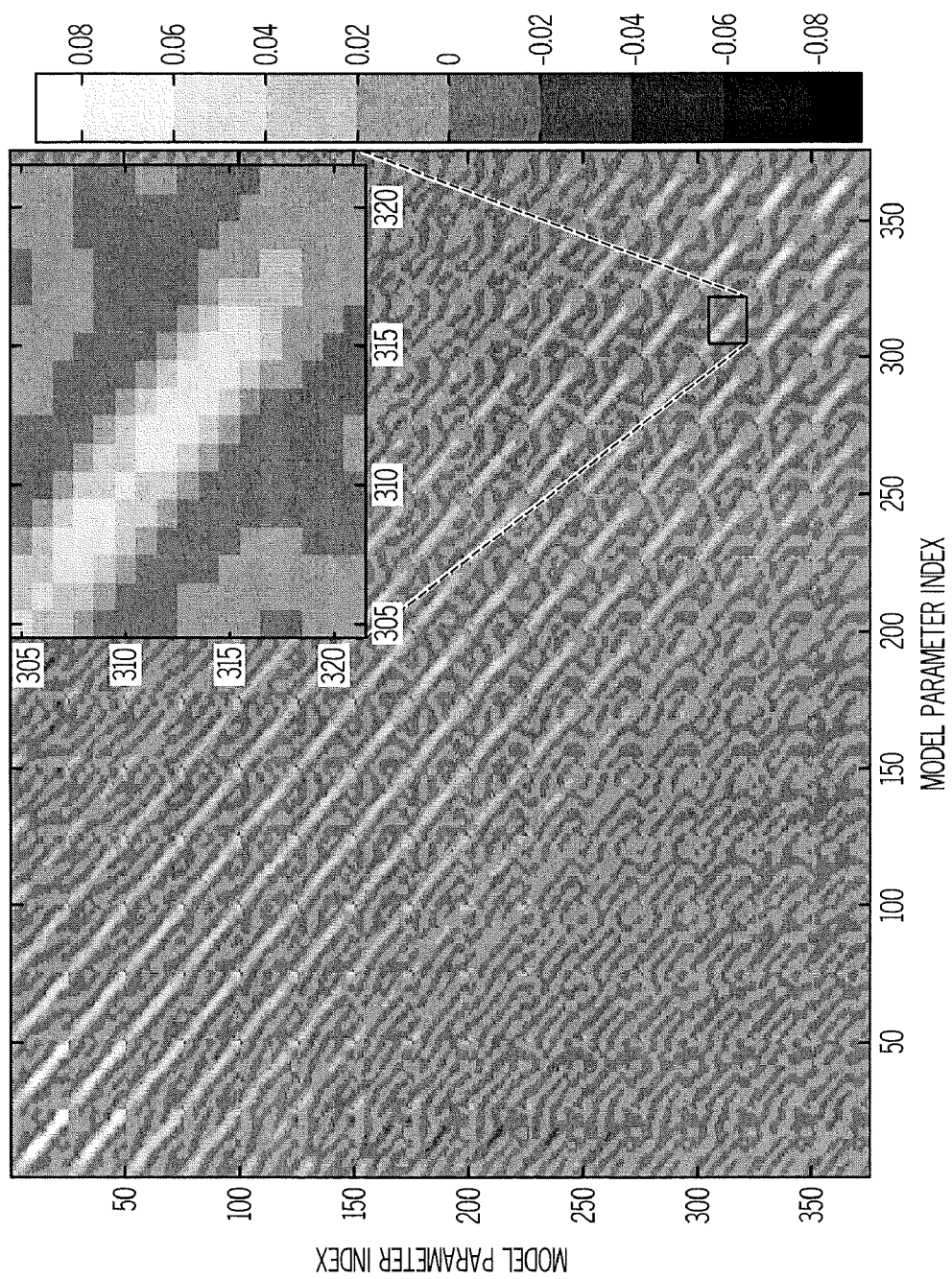
FIG. 6 is a representation of a model resolution matrix where data obtained with the same gradient are selected for processing with the single gradient algorithm.
Figure 7:
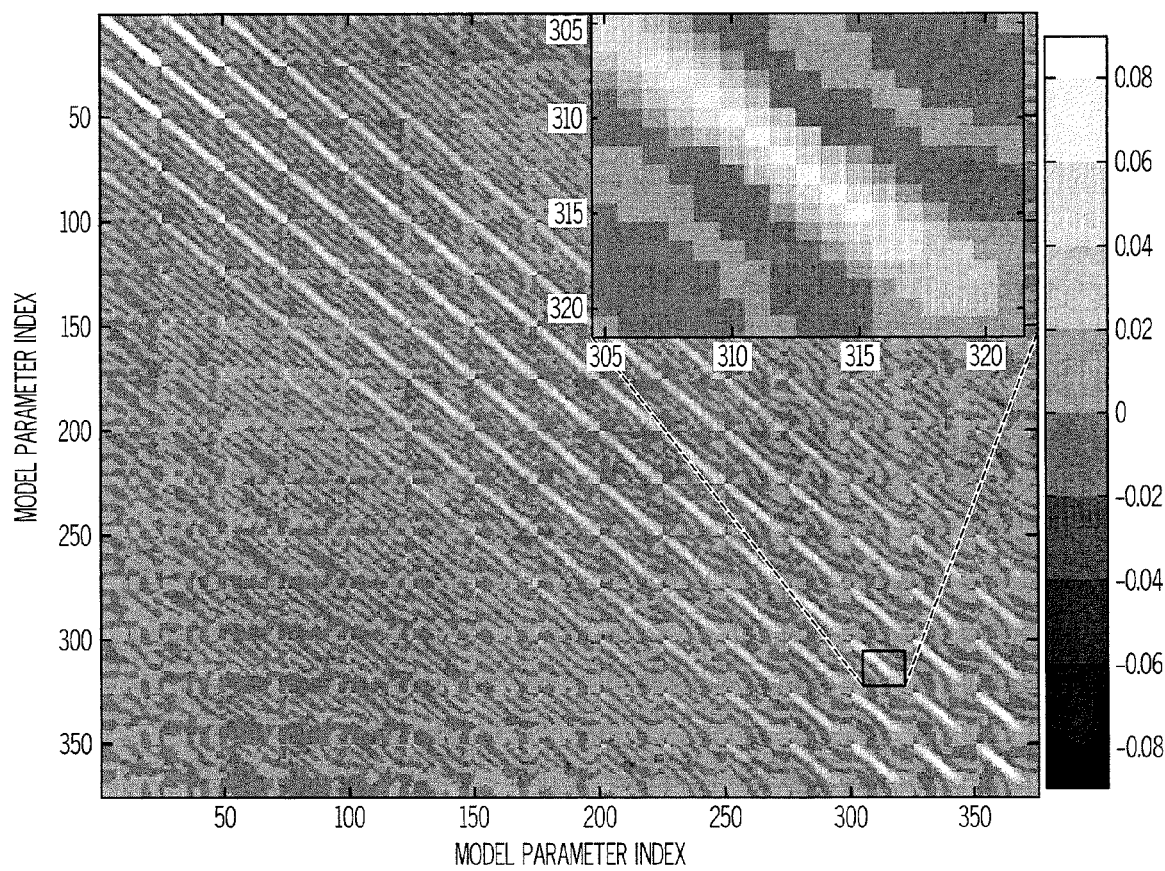
FIG. 7 is a representation of a model resolution matrix where data obtained with multi-gradients are processed with a multi-gradient algorithm.

To evaluate the resolving power of the inversion schemes for the given level of data noise and prior model constraints, the resolution matrices are computed using equation (19) and compared. FIGS. 5-7 show the model resolution matrices for the three different schemes. Note that the ideal model resolution matrix is the identity matrix displayed in FIG. 4 using the same format as in FIGS. 5-7. For a detailed view of the influence of neighboring parameters to each other, an inset is provided in the upper right corner in FIGS. 4-7. The inset magnifies 17 parameters with indices 305-321. These parameters correspond to $T_1/T_{2,app}$=64 and $T_{2,app}$=2-512 msec. Resolution in this subset of parameters is important to discern gas from other reservoir fluids.

FIG. 5, implementing Scheme A, illustrates using multi-gradient NMR data with the single-gradient processing algorithm. The gradient effects are inadequately modeled and result in degradation of the associated model resolution matrix, which is dominated by off-diagonal elements. The high oscillations may be alleviated with enhancing the influence of the stabilizer at the cost of a loss of spectral resolution.

FIG. 6, implementing Scheme B where the lower gradient long echo trains were not used, illustrates that the model resolution matrix performs acceptably. The influence of neighboring parameters generally decreases with distance in the parameter domain with slight oscillations. This model resolution matrix approximates the identity matrix much better than in the case of scheme A. It can be concluded that if using a single-gradient formulation, then multi-gradient data should be partitioned into single gradient components and processed separately.

FIG. 7 illustrates the model resolution matrix of Scheme C. This model resolution matrix is superior to that of Scheme A, highlighting the importance of the generalized forward operator when processing all data together. In addition, this model resolution matrix has sharper features than in the case of Scheme B. The sharper features demonstrate the benefits of using more data to resolve the same number of model parameters. In addition, there are procedural advantages to single-step processing over partitioning of data and reconciling the results subsequently.

Noise-related statistical model variations for each scheme can be analyzed by calculating the a posteriori model covariance matrices as defined in equation (17) without the need of repetitive testing. The diagonal elements of the model covariance matrix represent the variance of each individual model parameter while off-diagonal elements represent the covariances of two parameters.

Figure 8A:
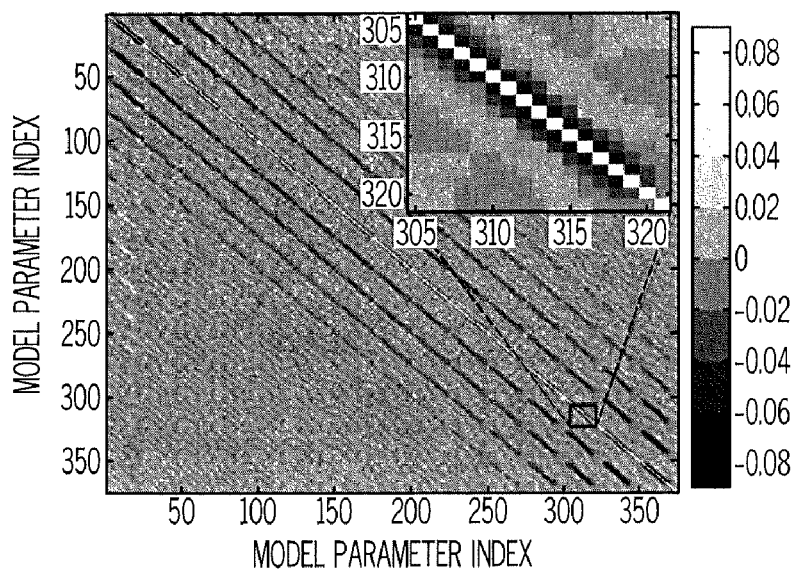
FIGS. 8A, 8B, and 8C, collectively referred to as FIG. 8, represent a posteriori covariance matrices for three processing schemes.
Figure 8B:
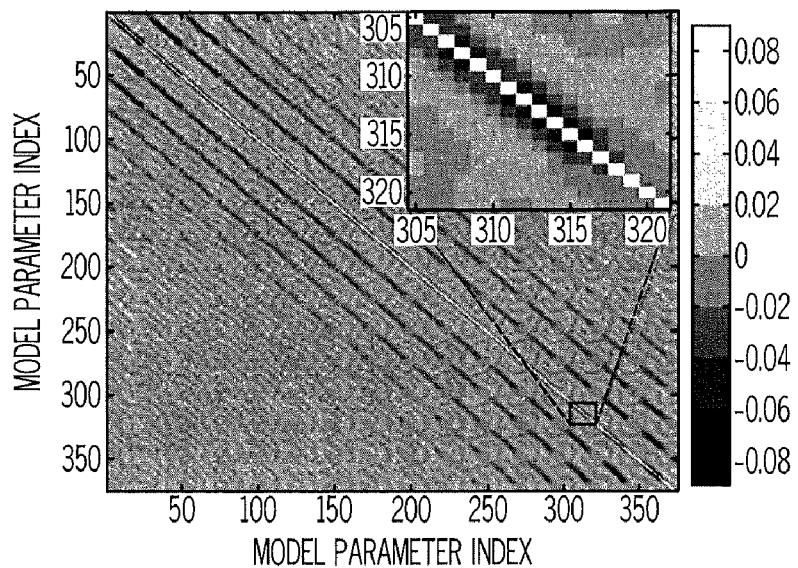
Figure 8C:
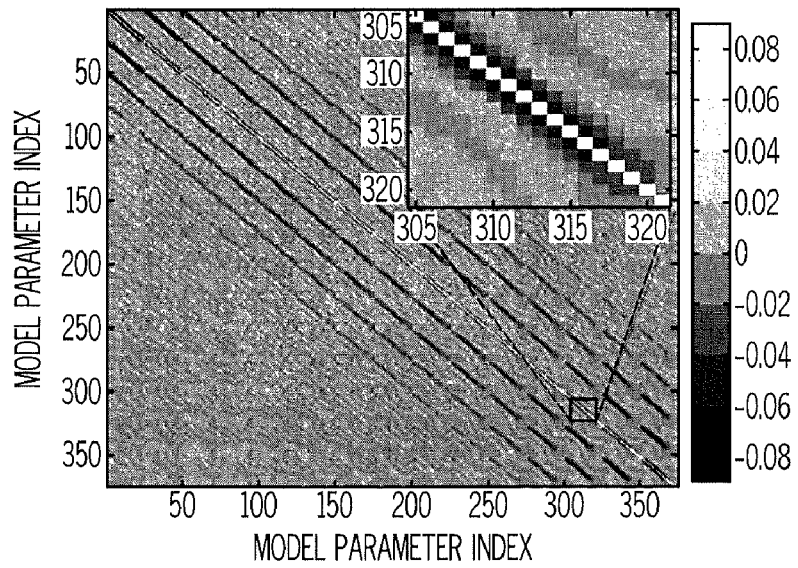

FIG. 8 illustrates the covariance matrices for the three schemes presented above (FIG. 8A for Scheme A, FIG. 8B for Scheme B, and FIG. 8C for Scheme C). Although slight variations occur, there is no noticeable difference between these matrices.

Figure 9:
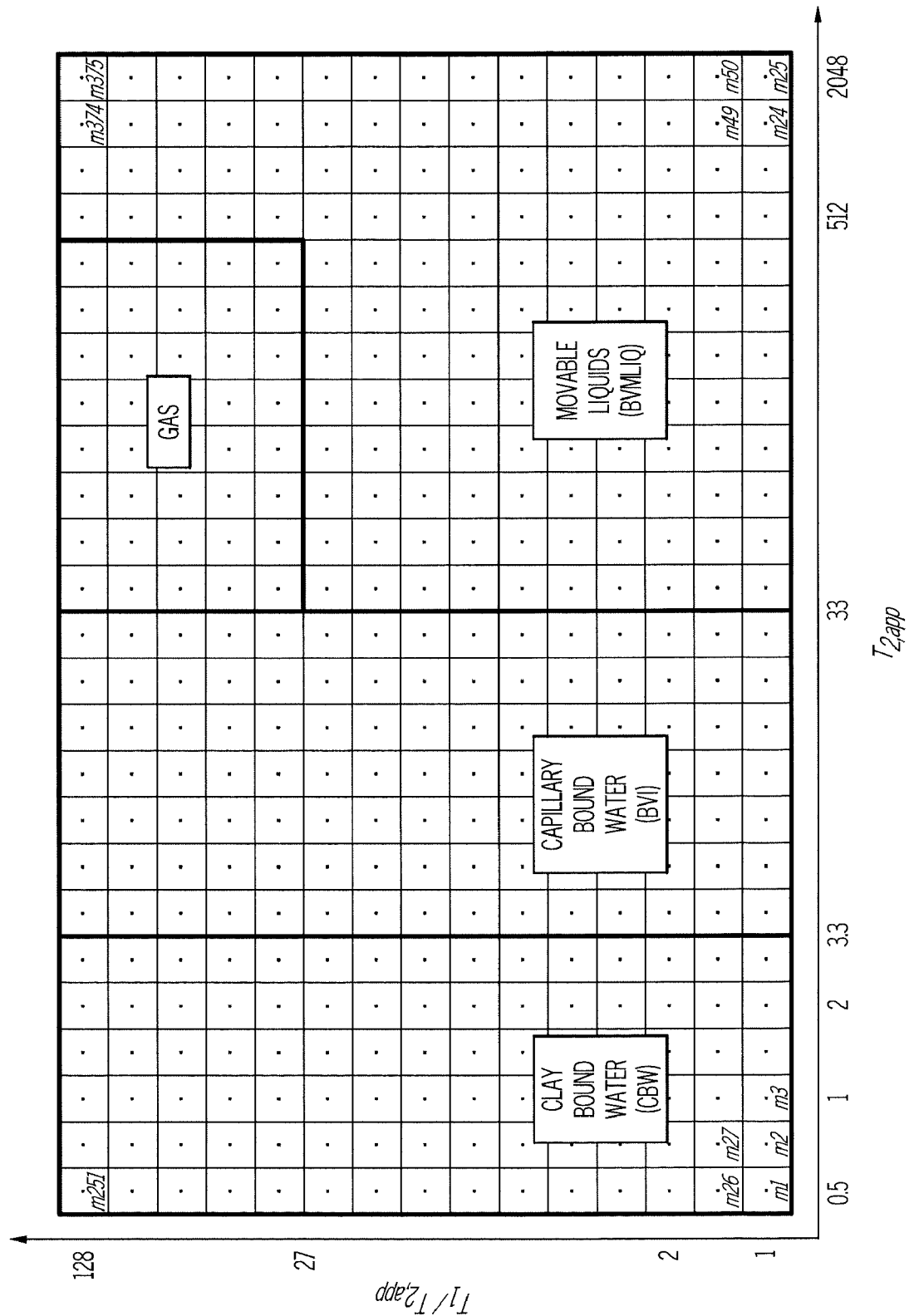
FIG. 9 illustrates a partitioned parameter map.

From the standpoint of NMR petrophysics, it is more practical to analyze the errors of certain combinations of the model parameters. For the analysis presented here, the model may be partitioned into six different components: clay-bound water (CBW), capillary-bound water (BVI), movable fluids (BVM), gas (VGAS), effective porosity (MPHE=BVM+BVI), and total porosity (MPHS+MPHE+CBW) as shown in FIG. 9. From any given porosity distribution, these quantities can be obtained by summing all model parameters belonging to the corresponding partition. The summing can be done mathematically by introducing the petrophysical analysis matrix, P, as shown in equation (20) where each row represents a particular petrophysical component.

$$P = \begin{bmatrix} W_{CBW} \\ W_{BVI} \\ W_{BVM} \\ W_{VGAS} \\ W_{MPHE} \\ W_{MPHS} \end{bmatrix} \quad (20)$$

For example, $W_{CBW}$ may be represented as shown in equation (21)

$$W_{CBW} = [1111110\ldots01111110\ldots]_{1 \times Nm} \quad (21)$$

The variances of petrophysical properties then can be obtained as shown in equation (22).

$$\begin{bmatrix} \text{var}(CBW) \\ \text{var}(BVI) \\ \text{var}(BVM) \\ \text{var}(VGAS) \\ \text{var}(MPHE) \\ \text{var}(MPHS) \end{bmatrix} = P^T C_m^\# P \quad (22)$$

Figure 10:
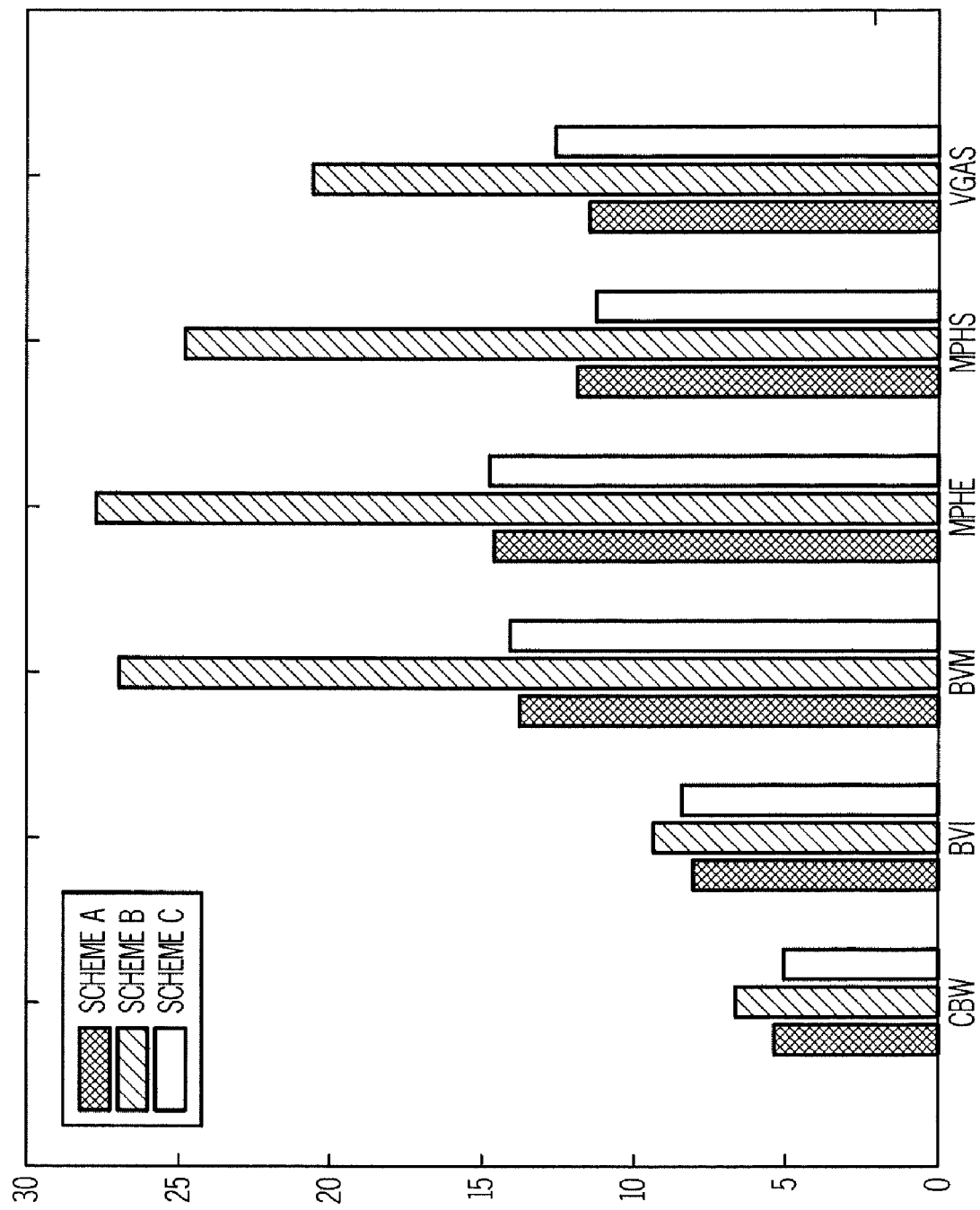
FIG. 10 depicts variances of volumetric petrophysical attributes for the three processing schemes using the a posteriori covariance matrices.

FIG. 10 illustrates these uncertainties for each of the three schemes. It can be seen that Schemes A and C, which rely of the full data set, yield lower variance than Scheme B, which relies on a less than full data set.

Figure 11:
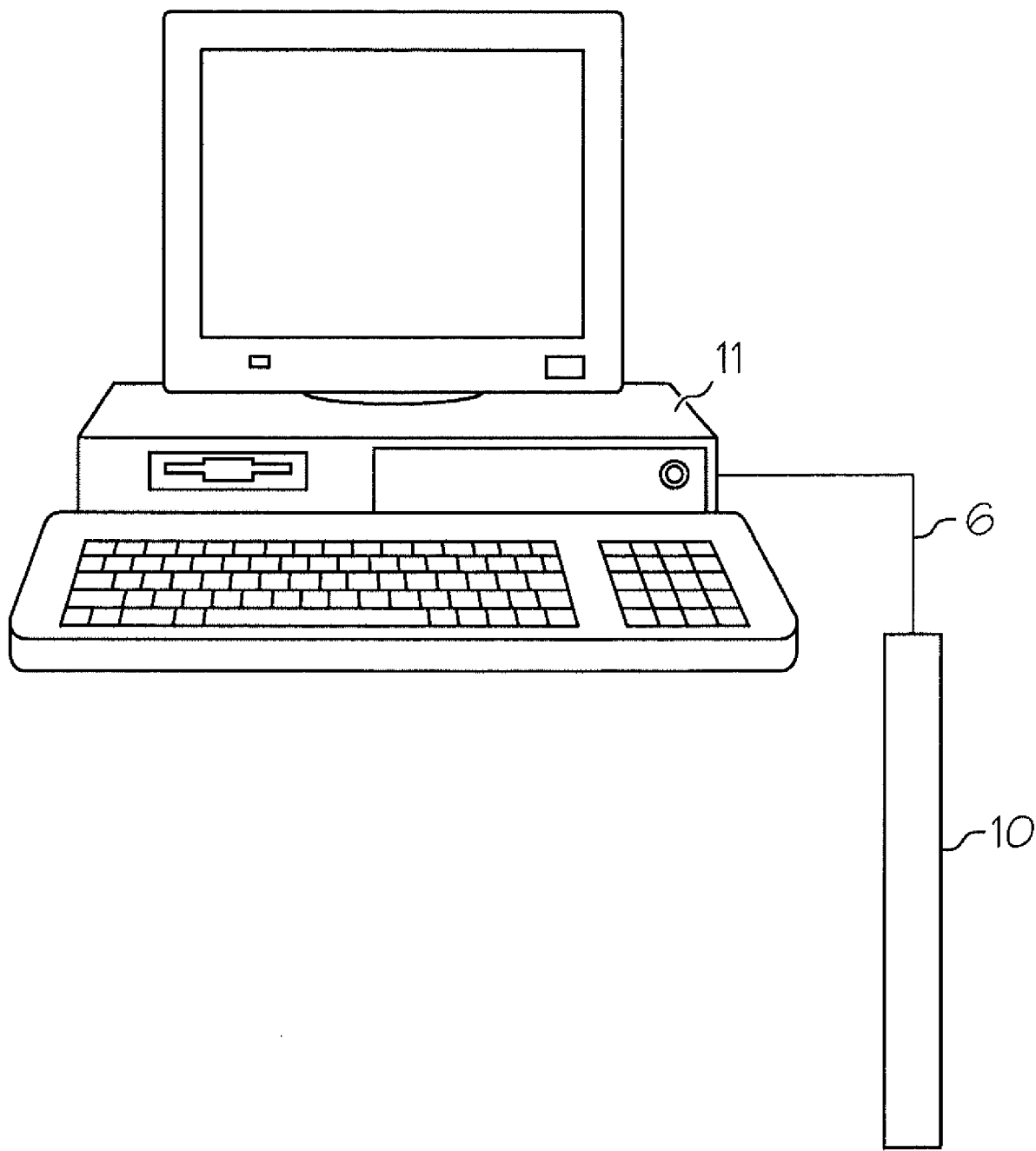
FIG. 11 illustrates an exemplary embodiment of a computer coupled to the logging instrument.

Referring to FIG. 11, an apparatus for implementing the teachings herein is depicted. In FIG. 11, the apparatus includes a computer 11 coupled to the well logging instrument 10. Typically, the computer 11 includes components as necessary to provide for the real time processing of data from the well logging instrument 10. Exemplary components include, without limitation, at least one processor, storage, memory, input devices, output devices and the like. As these components are known to those skilled in the art, these are not depicted in any detail herein.

Generally, some of the teachings herein are reduced to an algorithm that is stored on machine-readable media. The algorithm is implemented by the computer 11 and provides operators with desired output. The output is typically generated on a real-time basis.

The logging instrument 10 may be used to provide real-time determination of a property of the formations 4. As used herein, generation of data in "real-time" is taken to mean generation of data at a rate that is useful or adequate for making decisions during or concurrent with processes such as production, experimentation, verification, and other types of surveys or uses as may be opted for by a user or operator. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 12:
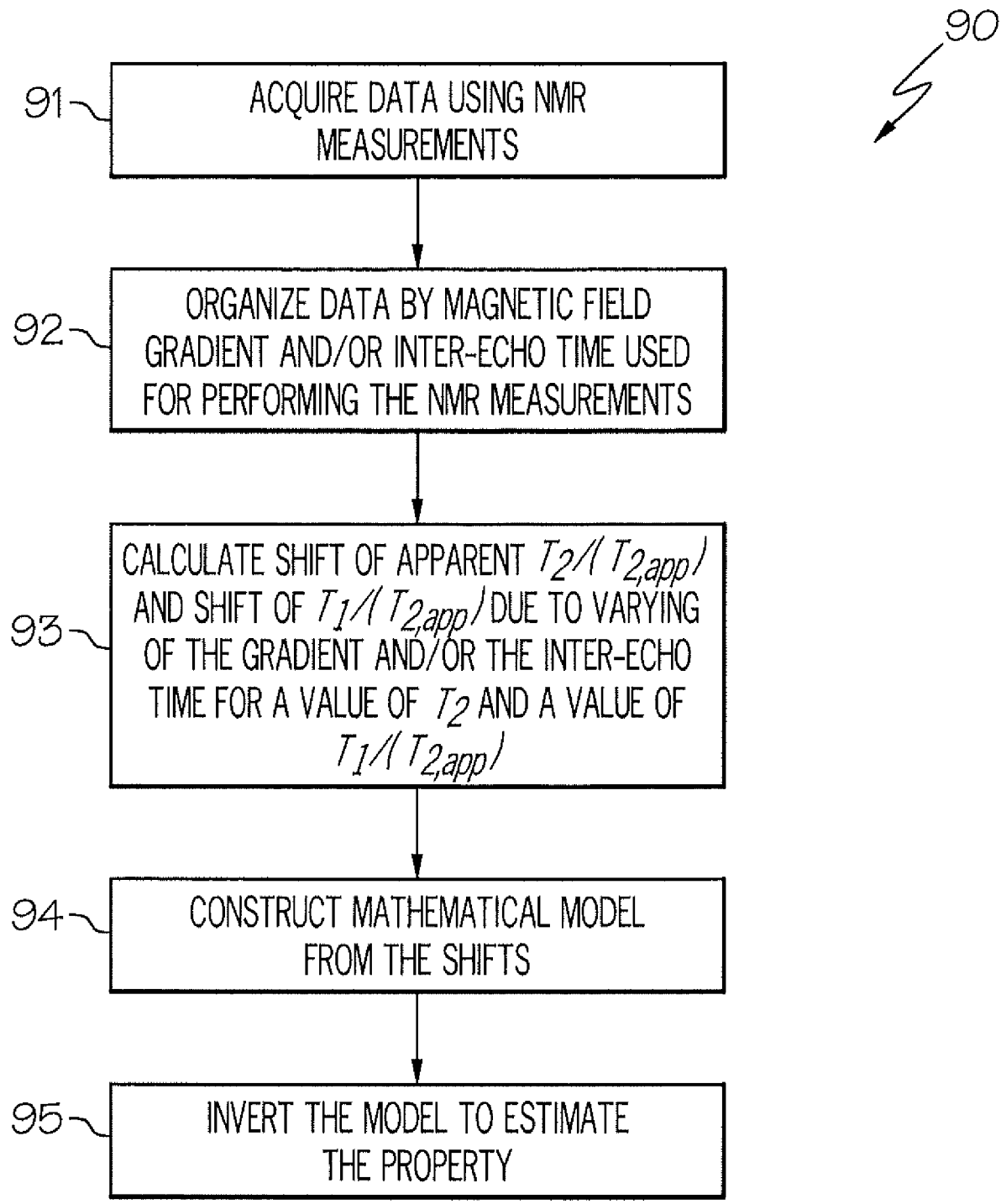
FIG. 12 presents one example of a method for determining a property of a material.

FIG. 12 presents one example of a method 90 for estimating a property of a material. The method 90 includes (step 91) acquiring data using NMR measurements. The measurements are performed by varying at least one of the magnetic field gradient (G) and the inter-echo time (TE). Further, the method 90 includes (step 92) organizing the data according to at least one of magnetic field gradients (G) and inter-echo times (TE) used in the NMR measurements. Further, the method 90 includes (step 93) calculating a shift of apparent transverse relaxation time $T_{2,app}$ and a shift of (longitudinal relaxation time $T_1)/(T_{2,app})$ due to the varying for a value of $T_2$ and a value of $T_1/(T_{2,app})$. Further, the method 90 includes (step 94) constructing a mathematical model of the NMR measurements from the shift. Further, the method 90 includes (step 95) inverting the model to estimate the property.

In support of the teachings herein, various analysis components may be used, including digital and/or analog systems. The digital and/or analog systems may be used in the electronic unit 9 for at least one of recording and processing signals from the NMR probe 8. The electronic unit 9 may be disposed at least one of in the logging instrument 10 and at the surface of the earth 7. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), vacuum supply, pressure supply, cooling unit, heating unit, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a property of a material, the method comprising:
   acquiring data using nuclear magnetic resonance (NMR) measurements, the measurements performed by varying at least one of a magnetic field gradient (G) and an inter-echo time (TE);
   organizing the data according to at least one of magnetic field gradients (G) and inter-echo times (TE) used in the NMR measurements;
   calculating a shift of apparent transverse relaxation time $T_{2,app}$ and a shift of (longitudinal relaxation time $T_1$)/ (apparent transverse relaxation time $T_{2,app}$) due to a variation of the product of G and TE;
   constructing a mathematical model of the NMR measurements from the shifts; and
   inverting the mathematical model to estimate the property.

2. The method as in claim 1, wherein the measurements further comprise a plurality of wait times (TW).

3. The method as in claim 2, wherein the mathematical model comprises the following series of equations:

$$M(t, TW, G, TE)_i = \sum_j m_j(1 - \exp(-TW_i/(T_{2,app,j} \cdot R_j)))\exp(-t_i/T_{2,app,j}),$$

$$R_k = \frac{T_1}{T_{2,int}} + \left(R_{REF} - \frac{T_1}{T_{2,int}}\right) \cdot \frac{(G_k \cdot TE_k)^2}{(G_{REF} \cdot TE_{REF})^2}, \text{ and}$$

$$\frac{1}{T_{2,app,k}} = \frac{1}{T_{2,app,REF}} + \frac{(R_{REF} - (T_1/T_{2,int}))}{T_1} \cdot \frac{(G_k \cdot TE_k)^2 - (G_{REF} \cdot TE_{REF})^2}{(G_{REF} \cdot TE_{REF})^2}$$

where:
   M represents predicted output of an NMR instrument;
   t represents time;
   TW represents the wait time;
   G represents a magnetic field gradient;
   $G_{REF}$ represents a reference value for the magnetic field gradient;
   TE represents an inter-echo time;
   $TE_{REF}$ represents a reference value for the inter-echo time;
   $T_1$ represents longitudinal relaxation time;
   $T_{2,app}$ represents apparent transverse relaxation time;
   m represents a frequency of occurrence of hydrogen particles represented by a combination of $T_{2,app}$ and $T_1/(T_{2,app})$;
   $T_{2,int}$ represents intrinsic transverse relaxation time; and
   i, j, and k represent index values.

4. The method as in claim 3, wherein M (t, TW, G, TE)$_i$ is represented as a column vector and $m_j$ is represented by a column vector such that:

$[M_i]=[A_{i,j}][m_j]$ where $[A_{i,j}]$ is a matrix relating $[M_i]$ to $[m_j]$.

5. The method as in claim 4, wherein $[m_j]$ is determined using an inverse of $[A_{i,j}]$ such that:

$[m_j]=[A_{i,j}]^\#[M_i]$ where $[A_{i,j}]^\#$ represents the inverse operator of $[A_{i,j}]$.

6. The method as in claim 1, further comprising placing a logging instrument in a borehole to acquire the data.

7. The method as in claim 1, further comprising calculating a shift of $T_{2,app}$ with respect to a reference value of $T_{2,app}$ due to the varying for a value of $T_1$/(intrinsic transverse relaxation time $T_{2,int}$).

8. The method as in claim 7, wherein the value of $T_1/(T_{2,int})$ is approximately one for light hydrocarbon analysis.

9. The method as in claim 7, wherein the reference value for $T_{2,app}$ comprises a reference value for a magnetic field gradient ($G_{REF}$) and a reference value for an inter-echo time ($TE_{REF}$).

10. The method as in claim 1, further comprising calculating a shift of $T_1/(T_{2,app})$ with respect to a reference value for $T_1/(T_{2,app})$ due to the varying for a value of $T_1/(T_{2,int})$.

11. The method as in claim 10, wherein the value of $T_1/(T_{2,int})$ is approximately one for light hydrocarbon analysis.

12. The method as in claim 10, wherein the reference value for $T_1/(T_{2,app})$ comprises a reference value for a magnetic field gradient ($G_{REF}$) and a reference value for an inter-echo time ($TE_{REF}$).

13. The method as in claim 12, wherein a maximum value of the reference value for $T_1/(T_{2,app})$ is less than or equal to a sufficiently large value that exceeds $T_1/(T_{2,app})$ for gas.

14. The method as in claim 1, wherein organizing comprises placing model parameters on a logarithmic grid.

15. The method as in claim 9, wherein the grid is divided into sections comprising a section for clay-bound water, a section for capillary-bound water, a section for movable liquids, and a section for gas.

16. The method as in claim 1, wherein organizing comprises partitioning the data into sections that include only a single gradient or inter-echo time.

17. The method as in claim 16, wherein calculating comprises calculating the shift using the data of one section.

18. An apparatus for estimating a property of a material, the apparatus comprising:
   a probe for making nuclear magnetic resonance measurements, the measurements performed by varying at least one of a magnetic field gradient and an inter-echo time; and
   an electronics unit for receiving data from the probe and for:
      organizing the data according to at least one of magnetic field gradients (G) and inter-echo times (TE) used in the NMR measurements;
      calculating a shift of apparent transverse relaxation time $T_{2,app}$ and a shift of (longitudinal relaxation time $T_1$)/ (apparent transverse relaxation time $T_{2,app}$) due to a variation of the product of G and TE;
      constructing a mathematical model of the NMR measurements from the shifts; and
      inverting the model to estimate the property.

19. The apparatus as in claim 18, further comprising a logging instrument.

20. A computer program product stored on machine readable media comprising machine executable instructions for estimating a property of a material, the product comprising instructions for:
   acquiring data using nuclear magnetic resonance (NMR) measurements, the measurements performed by varying at least one of a magnetic field gradient (G) and an inter-echo time (TE);
   organizing the data according to at least one of magnetic field gradients and inter-echo times used in the NMR measurements;
   calculating a shift of apparent transverse relaxation time $T_{2,app}$ and a shift of (longitudinal relaxation time $T_1$)/ (apparent transverse relaxation time $T_{2,app}$) due to a variation of the product of G and TE;
   constructing a mathematical model of the NMR measurements from the shifts;
   inverting the mathematical model to estimate the property; and
   at least one of recording the property and displaying the property to a user.

* * * * *